United States Patent [19]

Hastings

[11] Patent Number: 4,669,671

[45] Date of Patent: Jun. 2, 1987

[54] POLLUTANT SUPPRESSION DEVICE

[76] Inventor: Edward E. Hastings, 28 Wistar Rd., Villanova, Pa. 19085

[21] Appl. No.: 836,740

[22] Filed: Mar. 6, 1986

[51] Int. Cl.[4] .......................... B05B 5/02; B05C 3/06

[52] U.S. Cl. .................................. 239/690.1; 55/107; 239/691; 239/112; 361/228

[58] Field of Search ...................... 55/107; 239/3, 690, 239/691, 699–708, 112, 690.1; 361/226–228

[56] References Cited

U.S. PATENT DOCUMENTS

| | | | |
|---|---|---|---|
| 3,606,972 | 9/1971 | Ferrant . | |
| 3,698,635 | 10/1972 | Sickles | 239/3 |
| 4,004,733 | 1/1977 | Law | 239/3 |
| 4,009,829 | 3/1977 | Sickles | 361/228 X |
| 4,106,697 | 8/1978 | Sickles | 239/201 X |
| 4,120,017 | 10/1978 | Sickles | 361/228 |
| 4,190,875 | 2/1980 | Smart et al. | 361/228 |
| 4,335,419 | 6/1982 | Hastings | 239/691 |
| 4,360,155 | 11/1982 | Hubbell et al. | 239/700 X |

OTHER PUBLICATIONS

Dustron (Series 100)-Brochure of Keystone Dynamics, Inc., Villanova, Pa.

*Primary Examiner*—Andres Kashnikow

*Attorney, Agent, or Firm*—William H. Eilberg

[57] ABSTRACT

The invention is an electrostatic device which removes pollutants from an environment, by providing a spray of electrically charged liquid droplets. The device produces the charged droplets by directing the spray through an electrostatic charging head. The charging head includes two generally concentric rings having different resistivities. The resistivity of the outer ring is preferably at least ten times greater than that of the inner ring. The inner ring is connected to a power supply, and acts as the electrode for inductively charging the droplets. Because of its comparatively low resistivity, the inner ring can conduct some electric current, and can thus act as an electrode for inducing a charge on the droplets. The outer ring, having the higher resistivity, shields the inner ring, and reduces the risk of short circuits when the material has absorbed substantial amounts of moisture.

23 Claims, 3 Drawing Figures

POLLUTANT SUPPRESSION DEVICE

BACKGROUND OF THE INVENTION

The present invention relates to the field of pollution control, and specifically to electrostatic divices for removal of particles, such as dust or aerosols, from the air.

Devices for electrostatic dust suppression have been known for some time. U.S. Pat. No. 4,335,419 gives an example of such a dust control apparatus. The disclosure of the latter patent is incorporated by reference herein. In devices of the prior art, as exemplified by the disclosure in the cited patent, a stream of liquid is atomized in a nozzle, producing a large number of tiny droplets. The droplets pass through a charging ring, disposed around the nozzle. The ring is connected to a power supply, which electrically charges the ring. The ring induces a charge, of the opposite polarity, on the droplets leaving the nozzle.

The mechanism by which the above-described devices operate is not fully understood. It has been suggested, in the cited patent, that the charged droplets attract oppositely charged particles of dust or other fine pollutants, causing the pollutants to precipitate out of the air. The latter explanation is not wholly satisfactory, because it fails to explain why such devices tend to remove pollutants regardless of the polarity of their charges. A more probable mechanism is the creation of a "space charge" by the charged mist. By some means, possibly through free ions in the air, a charge of the same polarity as the space charge is transferred to the pollutant particles. The pollutant particles are therefore repelled from the space charge, in all directions. Any initial charges on the particles are overwhelmed by the greater space charge, so that their initial polarity becomes insignificant.

The first electrostatic dust suppression devices available on the market used bare metal electrodes as charging elements. But a bare metal electrode is a safety hazard. If handled while the unit is turned on, the electrode can cause an electric shock. Although the currents used in such devices are generally not sufficient to produce a lethal shock, such shocks can cause severe injuries indirectly. For example, the shock victim who is standing atop a tall ladder is likely to sustain severe injuries in a subsequent fall.

A bare metal electrode is likely to cause frequent electric discharges, similar to those created by a Van de Graff generator. These discharges are dangerous in an explosive environment. They have also been known to cause the devices to catch fire.

One possible alternative to a bare metal electrode is to use a less conductive material as the charging element. Thus, some of the electrostatic dust suppression devices of the prior art have employed a plastic material, such as phenolic, as the charging element. Phenolic is normally an insulator at commonly-used voltages, of the order of 120 volts. But at voltages substantially in excess of 1000 volts, phenolic will transmit a significant amount of leakage current. At these higher voltages, phenolic can function effectively as an inductive charging element.

But the use of phenolic as the material for the charging element creates new problems. When the phenolic has absorbed substantial amounts of moisture, its resistivity decreases further. The high votage, which is used to charge the liquid droplets, can "leak" along unexpected and undesired paths. Absorption of moisture thus can short-circuit part or all of the charging voltage to ground, impairing or destroying the effectiveness of the unit. The short-circuit due to moisture creates an additional shock hazard, And, as stated above, the device, in operation, constantly handles a stream of water, so the problem of moisture adsorption is always present, regardless of the external atmospheric conditions.

One can remove moisture from the phenolic electrode by baking it at high temperature, and then coating it with several layers of a material such as epoxy. This procedure eliminates the moisture, but does not always prevent its later reabsorption. The procedure also adds to the cost of making the device.

The present invention provides a device for suppressing dust and other pollutants, which does not require a bare metal electrode, and which also works reliably and safely at any level of humidity. With the device of the invention, it is not neccessary to bake, or otherwise specially treat, the charging head to drive off moisture. The invention employs a charging head made of at least two distinct materials, the materials having different resistivities, to provide adequate charging capability and also to maintain safety of operation.

SUMMARY OF THE INVENTION

The pollutant suppression device of the present invention is used to remove dust, or other particles, or aerosol pollutants, from the environment. The device includes a power supply, a nozzle connected to sources of liquid and air, and a charging head connected to the power supply. The charging head comprises two generally concentric rings. It is the inner ring which is the charging electrode, and which is electrically connected to the power supply. The resistivity of the outer ring is at least about ten times greater than the resistivity of the inner ring. Although the resistivity of the inner ring is comparatively low, it is preferred that the inner ring still be a material which is an insulator at ordinary voltages.

The inner ring is preferably connected to the power supply through a current limiting resistor, which further reduces the risk of electric shock. The inner ring is disposed near, or around, the nozzle, so that liquid droplets exiting the nozzle pass through the inner ring. The droplets receive a charge, by electric induction, from the inner ring, the charge being opposite to that of the inner ring. The charged droplets cause liquid and solid pollutant particles to be precipitated out of the environment.

In the preferred embodiment, the inner ring is constructed of a plastic material having a resistivity in the range of about $10^8$ ohm-cm to about $10^{10}$ ohm-cm. A material having a resistivity in this range is generally considered an insulator, but at higher voltages, it will transmit an electric current. One material found suitable for use as the inner ring is laminated phenolic.

The outer ring is constructed of a plastic material having a resistivity greater than about $10^{12}$ ohm-cm. Such a material is usually an insulator at any level of humidity. A material which has been used successfully is an acetal plastic, sold by the DuPont Company under the trademark Delrin. The outer ring does not conduct a significant amount of current, and therefore shields the inner ring. The shock hazard of the device is therefore greatly reduced, and the reliability of the device is enhanced. The outer ring does not interfere with the charging of the droplets by the inner ring.

It is therefore an object of the present invention to provide an electrostatic pollutant suppression device which removes particles from an environment.

It is another object of the invention to increase the reliability of electrostatic pollutant suppression devices.

It is another object of the invention to improve the safety of electrostatic pollutant suppression devices by reducing the electric shock hazard from such devices.

It is another object of the invention to provide a pollutant suppression device whose performance does not vary with changes in humidity.

It is another object of the invention to provide an electrostatic pollutant suppression device having an electrode which does not need to be specially treated to remove moisture.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
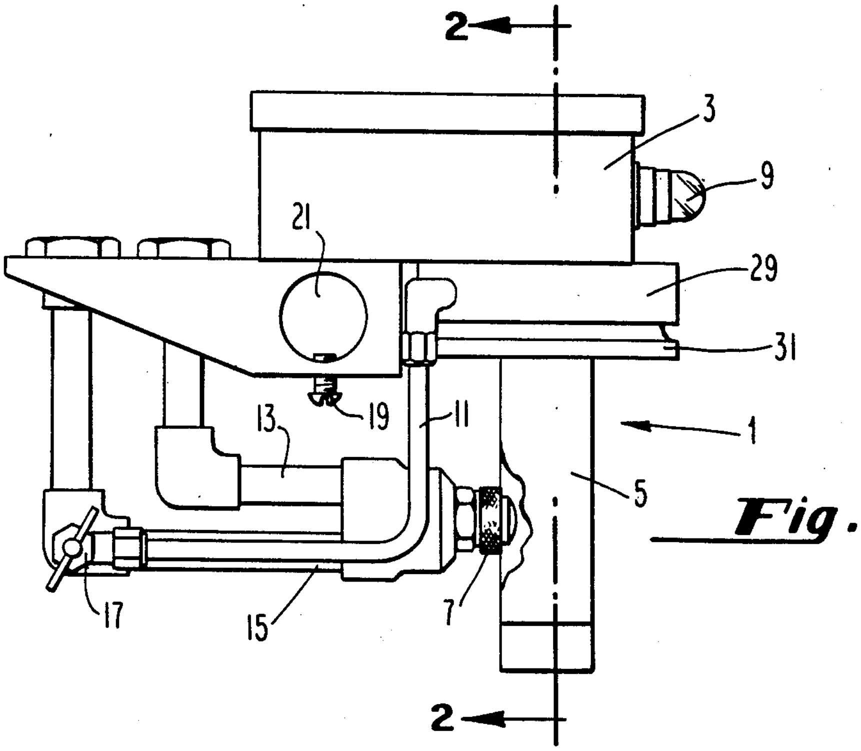
FIG. 1 is a side elevational view showing the pollutant suppression device of the present invention, the drawing being broken away to include a view of the nozzle.

The side elevational view of FIG. 1 shows the general configuration of an electrostatic pollutant suppression device 1. Device 1 includes power supply 3, charging head 5, and nozzle 7. Power supply 3 has a lamp 9 to indicate when the power is turned on. Liquid is supplied from an outside source (not shown) to liquid conduit 13. Air is supplied from an outside source (not shown) to air conduit 15. Conduit 11 is connected, by valve 17, to the source of air, and carries air to purge ring 29, which will be described more fully below. The air is mixed with the liquid, which is preferably water, to atomize the water into a mist of tiny droplets. The air in the conduit 11 helps to keep the purge ring 29 and purge collar 31 clean and dry, as described below.

A typical voltage used in the device described is about 10,000 volts. But the device can be used within the range of about 5,000 to about 50,000 volts. The actual voltage used is not critical to the operation of the invention.

The operating voltage can be generated by tapping a standard line voltage and transforming it to the desired range. It can also be supplied by bringing power directly from a high-voltage line, The unit can also be run from a battery, and can operate without a source of external power source for a limited time.

Hole 21 provides a means for mounting the device onto a bracket or other holding structure. Screw 19 is used to affix the device onto the bracket or other structure.

Figure 2:
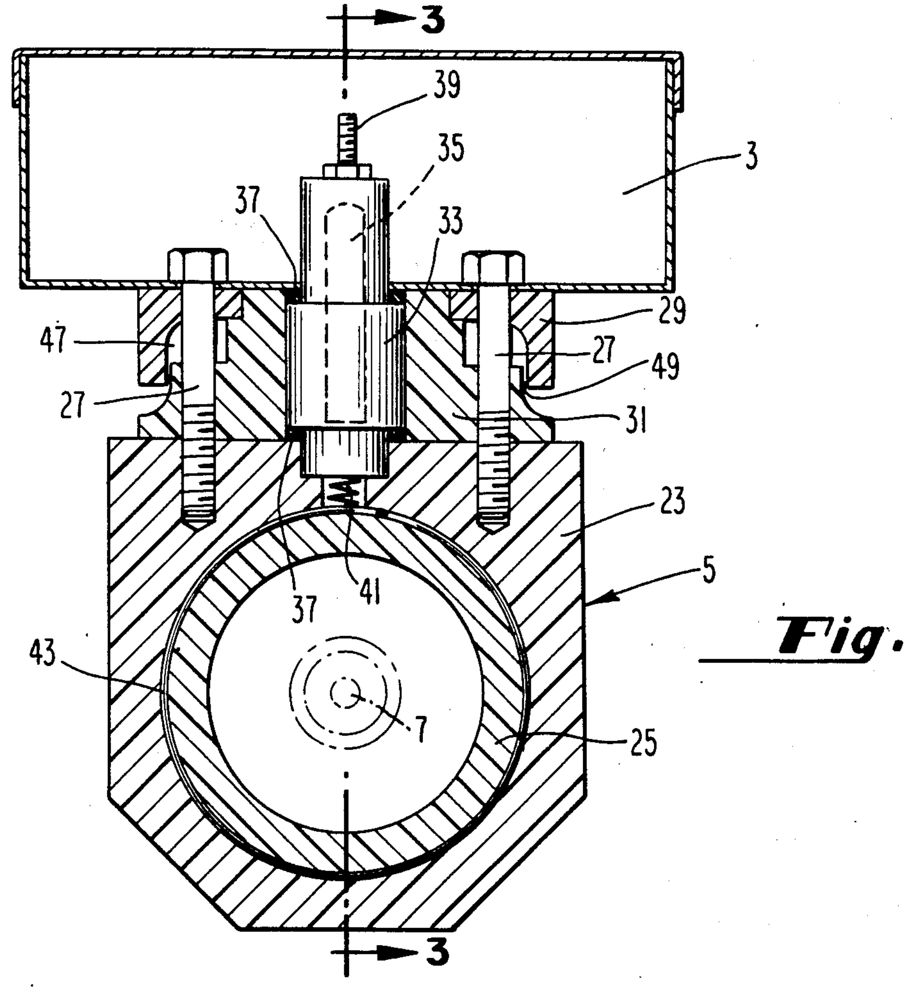
FIG. 2 is a cross-sectional view, taken along the line 2—2 of FIG. 1, showing the rings of the charging head and their attachment to the apparatus.
Figure 3:
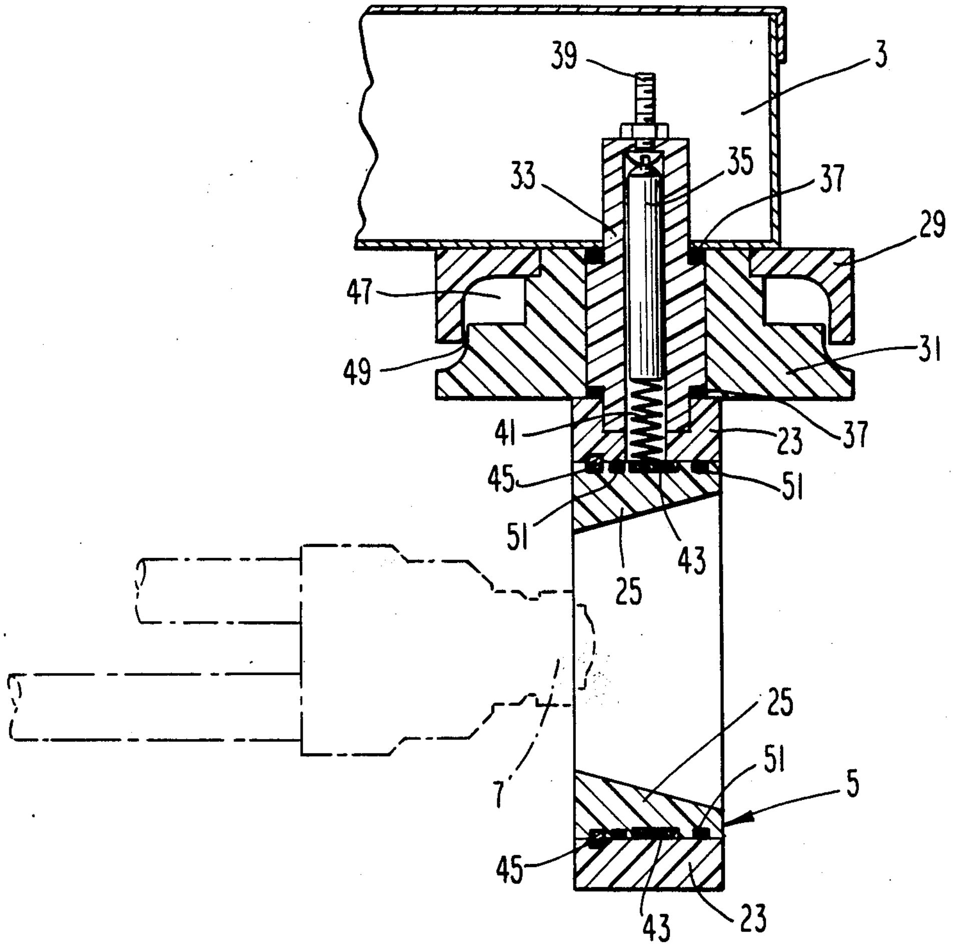
FIG. 3 is a cross-sectional view, taken along the line 3—3 of FIG. 2, showing another view of the rings of the charging head, and also showing part of the nozzle in phantom.

FIGS. 2 and 3 show more details of the construction of charging head 5. The charging head comprises an inner ring 25 and an outer ring 23. Outer ring 23 is attached to power supply 3 by bolts 27, which also pass through purge ring 29 and purge collar 31. The attachment of the outer ring to the power supply is mechanical only; the only electrical connection with the power supply is with the inner ring.

The inner ring is preferably constructed of a material having a resistivity in the range of about $10^8$ ohm-cm to about $10^{10}$ ohm-cm. For example, the inner ring can be made of laminated phenolic material. A sample of such material was tested and found to have resistivity ob about $5.3\times10^9$ ohm-cm. After being allowed to absorb a significant amount of moisture, the resistivity of the material was observed to decrease to about $1.8\times10^9$ ohm-cm. A material having a resistivity in the stated range is considered an insulator at commonly-used voltages, but such a material will conduct a current when the voltage is substantially greater than 1000 volts.

The outer ring is preferably constructed of a material having a resistivity greater than about $10^{12}$ ohm-cm. Such a material could be an acetal plastic, such as is sold by the DuPont Company under the trademark Delrin, or it could be a polycarbonate plastic. A sample of Delrin was tested and found to have a resistivity of greater than about $5\times10^{12}$ ohm-cm. Delrin has been used successfully in practicing the present invention.

While the inner and outer rings have been constructed of laminated phenolic and acetal plastic, respectively, other materials, such as glass or other ceramic materials, are believed usable, as long as the proper resitivity relationships are maintained.

The purge ring and purge collar serve to isolate the outer ring from the power supply. The purge ring and purge collar define an annular space 47, into which air from conduit 11 is directed. The air tends to keep the purge ring and collar clean and dry. By maintaining a fairly dry zone on the surface of the purge collar 31, the purge ring and collar break the path of possible surface conduction from the outer ring 23 back to the power supply 3.

Moisture is a problem, even though the outer ring is a good insulator. Its conductivity can be significantly increased when it is wet. As stated above, wetness is a continual problem in a device of this type. If the wet surface of the outer ring is allowed to conduct an electric charge along a path leading to the metal housing of the power supply, its surface would become an electrostatic shield, and would impair or destroy the effectiveness of the charging head.

FIGS. 2 and 3 show a current limiting resistor 35, which is placed in series between power supply 3 and the inner ring 25. The resistor limits the current carried by the apparatus, and further reduces the risk of electric shock.

Resistor 35 is contained within resistor housing 33, which occupies a cylindrical region defined by purge collar 31. The resistor housing is sealed against moisture by O-ring seals 37. Stud 39 provides an electrical connection between the resistor and the output of the power supply, and spring 41 provides electrical contact between the resistor and inner ring 25. The connection to the inner ring can also be accomplished by other means, and additional structures, such as wire coil 43, shown in FIG. 3, can be used to provide such connection.

Inner ring 25 can be anchored within outer ring 23 by any suitable means. For example, a locking ring 45, shown only in FIG. 3, can be inserted into a channel formed in outer ring 23, and passed around the inner ring. The locking ring prevents the inner ring from sliding along its axis. Other equivalent means for preventing movement of the inner ring can be used. O-ring seals 51 are also present as shown.

While the inner and outer rings have been described as specific plastic materials, it is not essential that these materials be used, or that the materials be plastics at all. What is important is that the rings be distinct materials, and that the resistivity of the outer ring exceed that of the inner ring by at least an order of magnitude, and preferably by two or more orders of magnitude. It is preferable that both of the rings be insulating materials at commonly-used voltages.

The inner and outer rings also need not be ring-shaped. As shown in the figures, outer ring 23 does not have the exact shape of a ring. The term "ring" is used because the structure encircles the path of travel of the liquid droplets. Other structures are possible. Indeed, it is not absolutely necessary that the "rings" entirely surround the path of the droplets. If space requirements or other conditions do not permit a full ring-shaped structure, it is possible to use truncated structures, such as half-rings or the like, although the charging capability of the inner ring may be somewhat impaired. What is important is that the material which performs the charging, and which has the lower resistivity, be located nearest to the stream of droplets, and that the material having the higher resistivity be located farther from the stream, in order to protect persons in the area from electric shocks.

The invention is not to be considered limited by the explanation of how the materials conduct electric current, or by the theories of how charged droplets cause pollutants to be removed from the environment. The successful operation of the device may be due to the physical phenomena described above, or may be due in part to electrical, electronic, or molecular mechanisms which are not yet perceived or understood. Regardless of the mechanisms at work, the structure disclosed above has been found to function safely and reliably for the purposes stated.

Other modifications to the device can be made. The particular arrangement of liquid and air conduits, the mounting of the inner and outer rings, and the choice of current limiting resistor, are all examples of further changes that can be made. These and other similar modifications should be considered within the spirit and scope of the following claims.

What is claimed is:

1. A pollutant suppression device, comprising:

(a) a power supply, (b) means for generating a plurality of liquid droplets, and (c) a charging head, the charging head being electrically connected to the power supply, the charging head being positioned to receive the droplets from the generating means and to induce an electrostatic charge onto said droplets, (d) the charging head comprising at least two generally concentric rings, the outer ring being constructed of an insulating plastic material having a resistivity greater than about $10^{12}$ ohm-cm, the inner ring being constructed of a generally insulating plastic material having a resistivity in the range of about $10^8$ ohm-cm to about $10^{10}$ ohm-cm.

2. The device of claim 1, wherein the inner ring is constructed of laminated phenolic material.

3. The device of claim 2, wherein the outer ring is constructed of an acetal plastic material.

4. The device of claim 3, wherein the electrical connection of the inner ring to the power supply includes a current limiting resistor.

5. The device of claim 4, further comprising a purge ring and purge collar, the purge ring and collar being disposed between the outer ring and the power supply, the purge ring and collar comprising means for isolating the outer ring from the power supply.

6. The device of claim 5, wherein the purge ring and collar together define an annular space, and wherein the device includes means for directing a stream of air into the annular space, wherein the space can be maintained in a relatively clean and dry condition.

7. In a pollutant suppression device, the device being designed to provide a mist of electrically charged liquid droplets for removing pollutants from the air, the device including a charging head for inducing an electric charge onto the liquid droplets, a power supply for providing a source of voltage to the charging head, and means for generating a spray of the droplets and for directing the droplets through the charging head, the improvement wherein the charging head comprises a pair of generally concentric rings, including an inner ring and an outer ring, wherein the inner ring has a resistivity less than the resistivity of the outer ring, and wherein both the inner ring and the outer ring are made of insulating materials.

8. The improvement of claim 7, wherein the inner ring has a resistivity in the range of about $10^8$ ohm-cm to about $10^{10}$ ohm-cm, and wherein the outer ring has a resistivity greater than about $10^{12}$ ohm-cm.

9. The improvement of claim 8, wherein the outer ring comprises a material which does not absorb substantial amounts of moisture, and wherein the electrical properties of said material remain constant under varying conditions of humidity.

10. The improvement of claim 9, wherein the inner ring comprises a laminated phenolic material.

11. The improvement of claim 10, wherein the outer ring comprises an acetal plastic material.

12. The improvement of claim 8, wherein the inner ring has a resistivity of the order of about $10^9$ ohm-cm.

13. The improvement of claim 12, wherein the outer ring has a resistivity of the order of at least about $10^{12}$ ohm-cm.

14. The improvement of claim 10, wherein the outer ring comprises a polycarbonate plastic material.

15. A pollutant suppression device, comprising:

(a) a power supply, (b) means for generating a plurality of liquid droplets, and (c) a charging head, the charging head being electrically connected to the power supply, the charging head being positioned to receive the droplets from the generating means and to induce an electrostatic charge onto said droplets, wherein the charging head comprises at least two generally concentric rings, both inner ring and the outer ring being constructed of insulating materials, the resistivity of the inner ring being less than the resistivity of the outer ring.

16. The device of claim 15, wherein the outer ring and the inner ring are both made of insulating materials.

17. The device of claim 16, wherein the resistivity of the outer ring is at least about ten times greater than the resistivity of the inner ring.

18. In a pollutant suppression device, the device being designed to provide a mist of electrically charged liquid droplets for removing pollutants from the air, the device including a charging head for inducing an electric charge onto the liquid droplets, a power supply for providing a source of voltage to the charging head, and means for generating a spray of the droplets and for directing the droplets through the charging head, the improvement wherein the charging head comprises at least two distinct materials, the first material being located near the spray of droplets. the second material being located farther away from the droplets than the first material, wherein the resistivity of the first material is less than the resistivity of the second material, and wherein both the first material and the second material are insulators.

19. The improvement of claim 18, wherein the resistivity of the second material is at least ten times the resistivity of the first material.

20. The improvment of claim 19, where inthe resistivity of the second material is greater than or equal to about $10^{12}$ ohm-cm.

21. The improvement of claim 20, wherein the resistivity of the first material is within the range of about $10^{8}$ ohm-cm to about $10^{10}$ ohm-cm.

22. The improvement of claim 21, wherein the first material is constructed of a laminated phenolic.

23. The improvement of claim 22, wherein the second material is constructed of an acetal plastic.

* * * * *